United States Patent
Le et al.

(10) Patent No.: US 6,856,868 B1
(45) Date of Patent: Feb. 15, 2005

(54) KINETIC ENERGY DENSITY ROLLOVER DETECTIVE SENSING ALGORITHM

(75) Inventors: Jialiang Le, Canton, MI (US); David James Bauch, South Lyon, MI (US); Kirsten Marie Carr, Ann Arbor, MI (US); Fubang Wu, Rochester Hills, MI (US); Clifford C. Chou, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/605,772

(22) Filed: Oct. 24, 2003

(51) Int. Cl.$^7$ .......................... G06F 19/00; B60G 23/00
(52) U.S. Cl. ............................ 701/38; 701/70; 701/72; 701/80; 180/282; 180/197; 340/440; 280/735
(58) Field of Search ................. 280/728.1, 755, 280/734, 735; 701/36, 41, 37, 72, 70, 42, 80, 38, 45; 180/197, 170, 271, 282, 274; 303/146, 166, 189; 340/447, 429, 438, 440

(56) References Cited

U.S. PATENT DOCUMENTS

| | | | |
|---|---|---|---|
| 6,282,479 B1 * | 8/2001 | Ghoneim et al. ............. 701/70 |
| 6,433,681 B1 | 8/2002 | Foo et al. .................... 340/440 |
| 6,496,758 B2 | 12/2002 | Rhode et al. .................. 701/1 |
| 6,529,811 B2 | 3/2003 | Watson et al. ................. 701/45 |
| 6,584,388 B2 | 6/2003 | Schubert et al. .............. 701/46 |
| 6,594,570 B2 * | 7/2003 | Nagao et al. ................. 701/45 |
| 2002/0019719 A1 | 2/2002 | Kueblbeck et al. ......... 702/147 |
| 2002/0087243 A1 * | 7/2002 | Sekizuka et al. ............. 701/45 |
| 2002/0139599 A1 | 10/2002 | Lu et al. ..................... 180/282 |
| 2002/0189883 A1 | 12/2002 | Lahmann et al. ........... 180/282 |
| 2003/0023359 A1 | 1/2003 | Kueblbeck et al. .......... 701/45 |
| 2003/0047927 A1 * | 3/2003 | Frimberger et al. ......... 280/755 |
| 2003/0100979 A1 * | 5/2003 | Lu et al. ..................... 701/36 |
| 2003/0130775 A1 * | 7/2003 | Lu et al. ..................... 701/36 |
| 2003/0130779 A1 * | 7/2003 | Hrovat et al. ................ 701/45 |
| 2003/0158633 A1 * | 8/2003 | Schubert ....................... 701/1 |
| 2003/0182025 A1 * | 9/2003 | Tseng et al. ................... 701/1 |
| 2003/0182041 A1 * | 9/2003 | Watson ......................... 701/45 |
| 2004/0059480 A1 * | 3/2004 | Hrovat et al. ................ 701/34 |
| 2004/0102894 A1 * | 5/2004 | Holler ........................ 701/124 |

FOREIGN PATENT DOCUMENTS

JP        2002166826 A  *  6/2002  ............. B60T/8/24

* cited by examiner

Primary Examiner—Thomas G. Black
Assistant Examiner—Tuan To
(74) Attorney, Agent, or Firm—Frank A. MacKenzie

(57) ABSTRACT

A rollover detection system (12) for an automotive vehicle (10) includes a controller (14) that is hooked to various types of sensors. The sensors may include a lateral acceleration sensor and another sensor or combination of sensors that gives an indication to another lateral condition of the vehicle. The controller determines a roll condition in response to comparing the lateral acceleration and the lateral condition other than lateral acceleration to a threshold. When the conditions are above the threshold then a roll condition is indicated. When a roll condition is indicated a safety device (40) may be controlled to prevent rollover and/or deploy a safety device.

20 Claims, 3 Drawing Sheets

KINETIC ENERGY DENSITY ROLLOVER DETECTIVE SENSING ALGORITHM

BACKGROUND OF INVENTION

The present invention relates generally to safety systems for automotive vehicles, and more particularly, to rollover protection systems and methods for detecting rollovers in automotive vehicles.

Vehicle safety systems such as dynamic control systems and certain airbags such as side curtain airbags rely upon a determination of whether the vehicle is rolling over for deployment. Dynamic control systems include rollover control systems that use a determination of the roll condition to prevent the vehicle from rolling over by applying the brakes or changing the steering direction. Side curtain airbags rely upon the roll condition determination for proper timing of the deployment of the side curtain airbags.

Many rollover control algorithms rely upon the lateral motion of the vehicle to determine the roll condition. The signals are not always adequate to determine rollover events such as low G rollover, slow rollovers, and soil trip events.

It would therefore be desirable to provide an improved roll condition determination for activation of safety devices in an automotive vehicle.

SUMMARY OF INVENTION

The present invention provides an improved determination of a roll condition using a two-dimensional threshold that is based on lateral acceleration and another lateral characteristic other than lateral acceleration.

In one aspect of the invention, a method of operating a safety system of an automotive vehicle includes determining a lateral acceleration of the vehicle, determining a lateral characteristic other than lateral acceleration, comparing the lateral acceleration and lateral characteristic to a threshold that is a function of the lateral acceleration and the lateral characteristic, indicating a roll condition in response to comparing, and controlling a safety system in response to the roll condition.

In a further aspect of the invention, a control system for an automotive vehicle includes a lateral acceleration sensor that generates a lateral acceleration signal, a longitudinal speed sensor generating a longitudinal speed signal, a lateral speed sensor generating a lateral speed signal, and a roll angle sensor generating a roll angle signal. A controller is coupled to the sensors and generates a side slip angle in response to lateral speed and longitudinal speed. The controller indicates a roll condition by comparing the lateral acceleration and the lateral characteristic to a threshold in response the side slip angle and a roll angle.

One advantage of the invention is that improved rollover detection may be obtained. That is, the present example may be suitable for providing low G, slow rollover and soil tripped rollover sensing.

Other advantages and features of the present invention will become apparent when viewed in light of the detailed description of the preferred embodiment when taken in conjunction with the attached drawings and appended claims.

DETAILED DESCRIPTION

Figure 1:
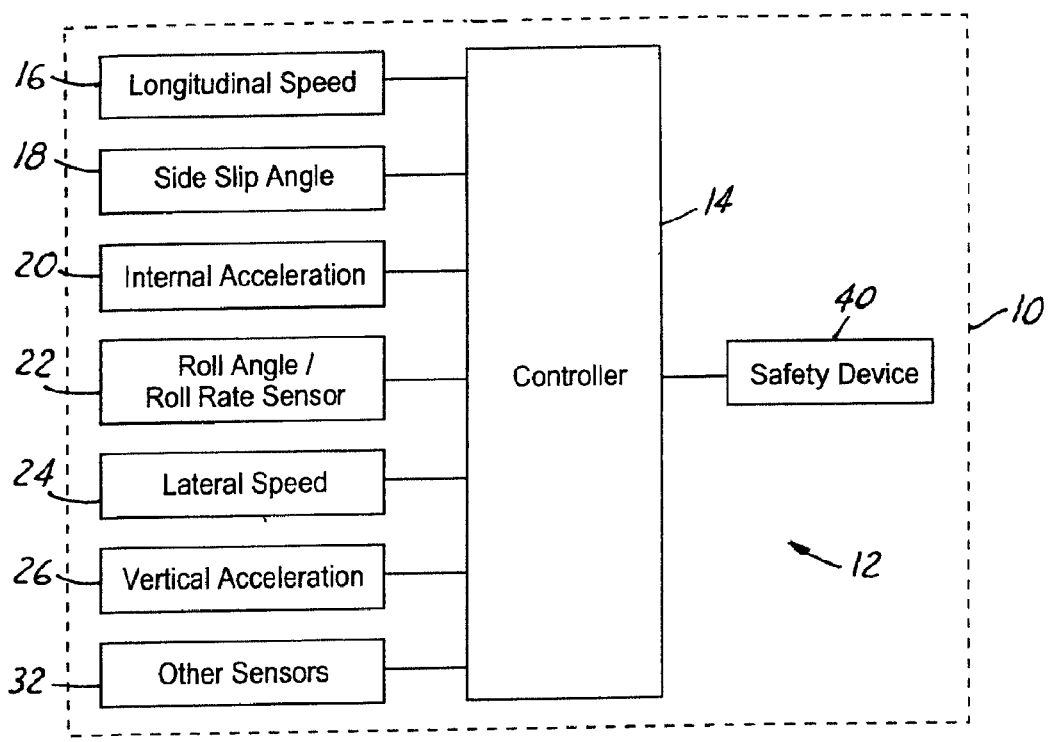
FIG. 1 is a block diagrammatic view of an automotive vehicle having a rollover detection system according to the present invention.

In the following figures the same reference numerals will be used to identify the same components.

While the present invention is described with respect to a safety device such as a side curtain airbag, the present invention is also suitable to be used with various types of safety devices including but not limited to roll stability control systems and the like.

Vehicle rollover events always start from the vehicle in forward motion which then translates to lateral motion plus some forward motion as the vehicle turns. In other words, the vehicle lateral speed starts from zero, reaches maximum value and then, goes back to zero, as a half sine wave pattern. When the lateral speed reaches a maximum, the vehicle has typically rolled about 8 to 10 degrees. The vehicle overcomes the first portion of rolling resistance. After that, the rolling resistance drops fast and the vehicle rolls over easily. There are two major factors that will induce vehicle rollover. First, vehicle kinetic energy transfers to the lateral motion. Next, the friction forces are applied to the tires. Without the kinetic energy the vehicle cannot roll over no matter how large the friction forces are. Lacking lateral friction forces, the vehicle slides as if on ice. In the present application, the lateral kinetic energy density and lateral acceleration are evaluated to determine the trigger time for deploying a rollover occupant protection system. As mentioned above, the present invention is also applicable to other types of safety devices such as a roll stability control system and the like.

Referring now to FIG. 1, an automotive vehicle 10 is illustrated having a rollover detection system 12. Rollover detection system 12 includes a controller 14. Controller 14 is preferably microprocessor-based.

Controller 14 is coupled to a plurality of sensors such as a longitudinal speed sensor 16, slide slip angle sensor 18, lateral acceleration sensor 20, a roll angle/roll rate sensor 22, a lateral speed sensor 24, a vertical acceleration sensor 26, and other sensors 32.

The longitudinal speed sensor 16 generates a longitudinal speed signal for the vehicle. The longitudinal speed sensor may be one of a variety of types of speed sensors known to those skilled in the art. For example, a suitable speed sensor may include a sensor at every wheel that is averaged by controller 14. The controller 14 may, for example, translate the speeds of each of the wheels into the speed of the vehicle. Transmission sensors and global positioning system signals may also be used to determine the longitudinal speed of the vehicle.

Side slip angle sensor 18 generates a side slip angle of the vehicle. The side slip angle may be a dedicated sensor or may be a signal derived from various sensors of the vehicle such as a longitudinal speed sensor 16 and a lateral speed sensor 24. The side slip angle is the angle formed in relation to the longitudinal speed and the lateral speed of the vehicle.

The lateral acceleration sensor 20 generates a lateral acceleration signal. The GPS system may be also used to generate a lateral acceleration signal.

Roll angle/roll rate sensor 22 is a sensor that generates a roll angle signal or a roll rate signal. If a roll rate sensor is used, the roll rate signal may be used to generate a roll angle. If roll angle sensor is used, the roll angle may be used to generate the roll rate of the vehicle. Either signal or both may be used by the controller 14 to determine the roll condition of the vehicle.

Lateral speed sensor 24 generates a lateral speed signal corresponding to the lateral speed of the vehicle. The lateral speed signal may be derived from the lateral acceleration sensor 20 or directly from a lateral speed sensor. The lateral acceleration described above may also be derived from the change in the lateral speed signal.

The vertical acceleration sensor 26 generates a signal corresponding to the vertical acceleration of the automotive vehicle. The vertical acceleration sensor 26 may be used as a safing sensor to check or "make safe" the roll condition determination.

The other sensors 32 may include various types of sensors such as a yaw rate sensor generating a yaw rate signal, a pitch rate signal generating a pitch rate signal, steering wheel angle sensor generating an angle corresponding to the angle of the hand wheel within the vehicle, a steering actuator position sensor generating an angle corresponding to the angle of the wheels with respect to the road, and a suspension sensor generating signals corresponding to the height or activation of the suspension components including anti-roll bars.

In response to the roll condition determined by controller 14, a safety device 40 is controlled. The safety device may, for example, be an airbag, an active braking system, an active front steering system, an active rear steering system, an active suspension system, an active anti-roll bar system, or other types of safety systems. One example of a suitable airbag is a side curtain airbag. Thus, the device may be an active device to prevent rollover from occurring or a device to reduce the injury to occupants of the vehicle.

Figure 2:
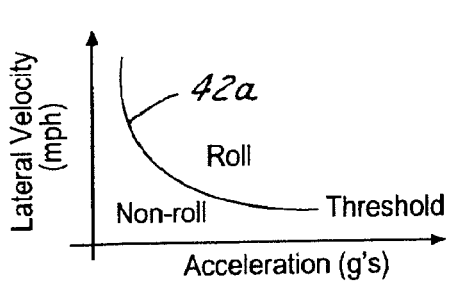
FIG. 2 is a plot of a first embodiment of a two-dimensional threshold comparing lateral velocity and acceleration.

Referring now to FIG. 2, a roll condition may be determined by comparing the sensed conditions to a threshold 42A. In FIG. 2, the threshold is a threshold that is a function of the lateral velocity and lateral acceleration. Above the threshold the condition is a roll condition whereas below the threshold 42A is a non-roll condition.

Figure 3:
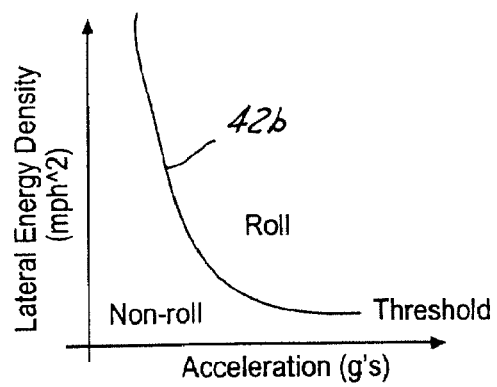
FIG. 3 is a plot of a second embodiment of the invention comparing lateral energy density and lateral acceleration.

Referring now to FIG. 3, a second threshold 42B may be used. Threshold 42B is a function of lateral energy density and lateral acceleration. Thus, the roll condition is determined above (to the right) of the threshold 42B, whereas, a non-roll condition is below (to the left) of the threshold 42B.

Figure 4:
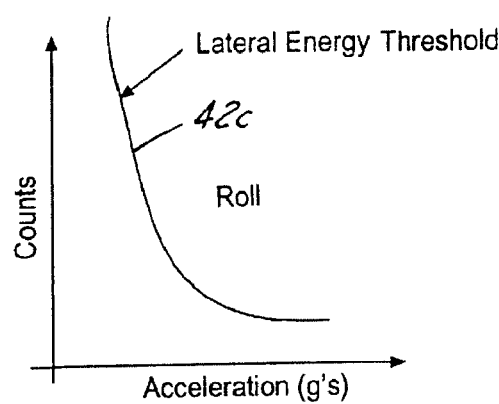
FIG. 4 is a plot of lateral energy versus acceleration for the present invention.

Referring now to FIG. 4, a third threshold 42C is a function of lateral energy versus lateral acceleration. This curve is similar to that shown in FIG. 3 above. Thus, a roll condition is above or to the right of the threshold, whereas to the left or below the threshold 42C is a non-roll condition.

Figure 5:
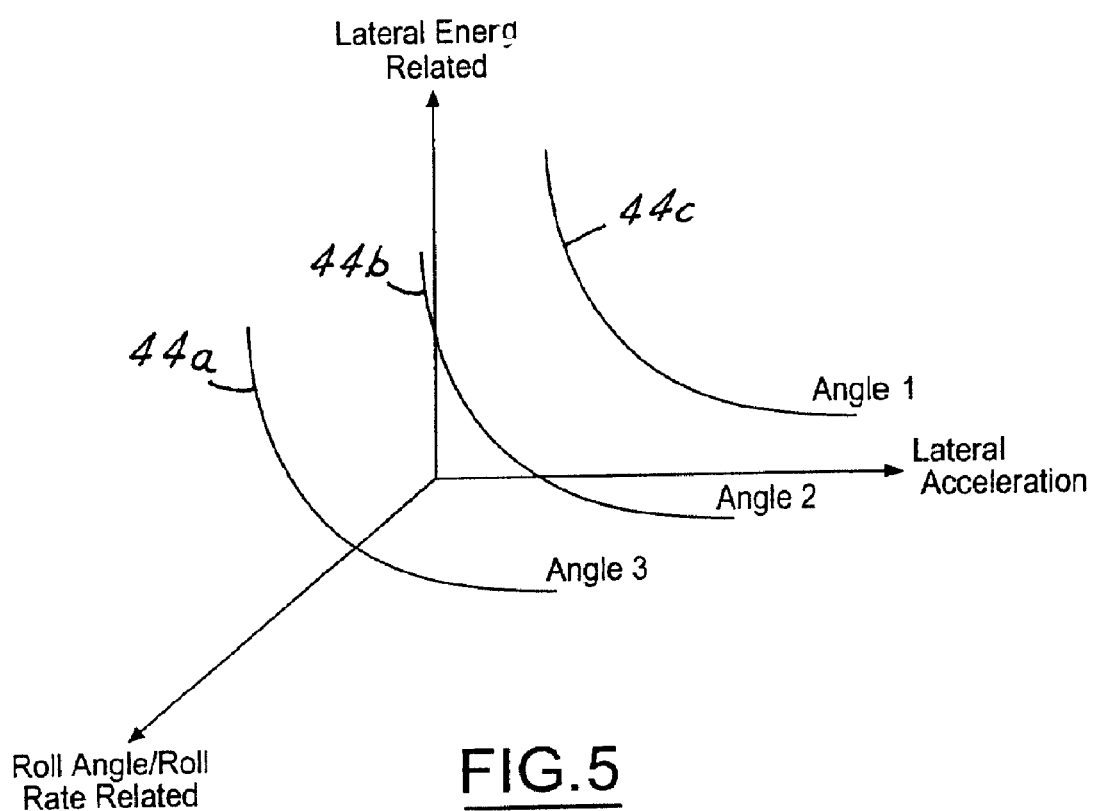
FIG. 5 is a three-dimensional plot illustrating the relationship of roll angle or roll rate versus lateral energy and lateral acceleration in response to thresholds.

Referring now to FIG. 5, lateral energy versus lateral acceleration is shown in three dimensions with the roll angle or roll rate related signal. Thus, the roll angle may be taken into consideration in various thresholds 44A, 44B, and 44C. As will be further described below, two thresholds may be met. That is, the lateral energy versus lateral acceleration threshold and a second roll angle threshold may be used for the ultimate roll angle determination.

Figure 6:
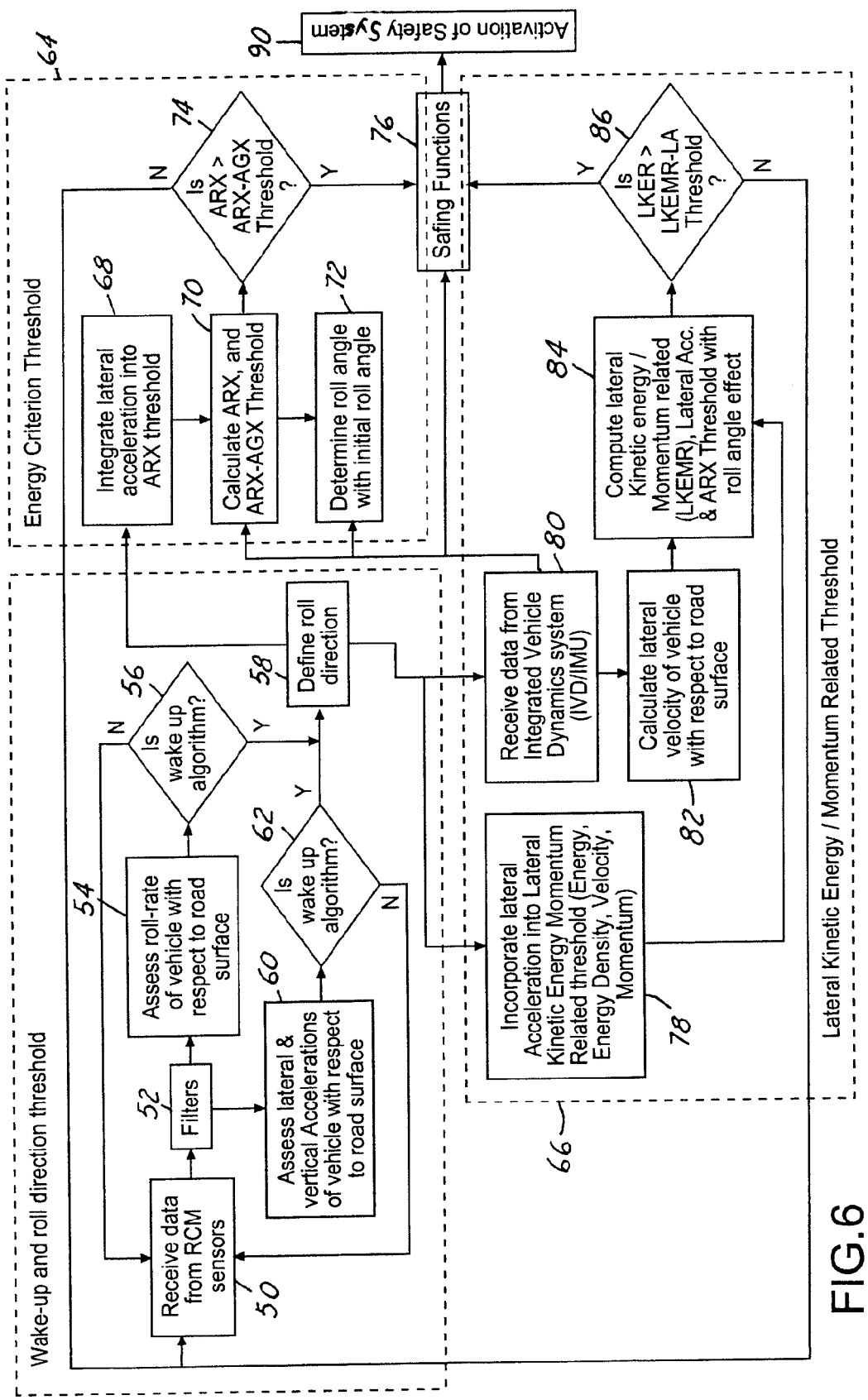
FIG. 6 is a flow chart of the operation of the rollover sensing system according to the present invention.

Referring now to FIG. 6, a method of operating the rollover detection system 12 of the present invention is illustrated. In step 50, data from the roll control sensors described above is received. In step 52, the sensor signals are filtered. In step 54, the roll rate of the vehicle with respect to the road is determined. After step 54, the roll control algorithm may be awoken in step 56. If the roll rate is not above a predetermined roll rate, step 50 is re-executed. If in step 56 the roll rate is greater than a threshold, step 58 is performed.

Referring back to step 52, the lateral and vertical accelerations of the vehicle with respect to the road surface are determined in step 60. If the lateral and/or vertical accelerations are greater than a threshold in step 62, the algorithm is awoken and step 58 is executed. In step 62 if the lateral and/or vertical accelerations are not greater than a threshold, step 50 is re-executed. In step 58, a roll direction according to the sensors is determined. After the roll direction the energy criterion threshold method 64 may be performed. Also after the roll direction is defined, block 66 determines that lateral kinetic energy/momentum related thresholds may be performed. In block 64, the lateral acceleration is integrated into the angular rate around the X-axis (ARX) threshold in step 68. After step 58 and/or after step 68, the angular rate around the X-axis (ARX) the angle around the X-axis (AGX) may be determined. The roll rate and the roll angle may be used to generate an ARX-AGX threshold. After step 58 and/or step 70, step 72 may be used to determine a roll angle using the initial roll angle determined by the sensors. In step 74 the comparison of the angular rate with the angular rate-angle threshold is performed. If the angular rate is above the angular rate-angle threshold in step 74, a roll condition is indicated and step 76 is performed. In step 76, various other sensors may be used as safing functions to confirm the presence of a roll condition.

Referring back to block 66, after the roll direction is defined in step 58, the lateral acceleration may be incorporated into the lateral kinetic energy momentum related threshold. Also, in step 80 data may be received from a vehicle dynamics system such as an IVD or integrated measurement unit. After step 80, step 82 may be used to calculate the lateral velocity of the vehicle with respect to the road surface. After step 82 and after step 78, step 84 may be performed. In step 84 the lateral kinetic energy/ momentum related energy, the lateral acceleration and the angular rate threshold with respect to the roll angle may be computed. If the lateral kinetic energy is greater than the kinetic energy/lateral acceleration threshold in step 86 the safing function is activated in step 76. In step 86 if the lateral kinetic energy is not greater than the threshold, step 50 is again executed. It should be noted that this example uses the lateral kinetic energy, however, lateral velocity, lateral energy, and lateral energy density may all be used interchangeably to form the threshold for comparison and the comparing value (LKER).

It should be noted that the present invention may provide a first indication of a roll condition in response to lateral acceleration and a lateral condition other than lateral acceleration alone or in combination with the comparison with a roll angle-roll rate threshold. In such a case where both are used the lateral acceleration-lateral characteristic other than lateral acceleration may be used as a first indication of a roll condition and the roll rate-roll angle may be used as a second indication of a roll condition.

The safing functions in block 76 are used to double-check the roll condition determination. The safing function may, for example, be vertical acceleration. If a vertical acceleration corresponding to a roll condition is present along with an indication from the first and second or first or second roll conditions, a safety system may be activated In step 90. As mentioned above, the safety system may comprise one of several different types of safety systems. While particular embodiments of the invention have been shown and described, numerous variations and alternate embodiments will occur to those skilled in the art. Accordingly, it is intended that the invention be limited only in terms of the appended claims.

What is claimed is:

1. A method of operating a safety system of an automotive vehicle comprising:

determining a lateral acceleration of the vehicle;

determining a lateral characteristic other than lateral acceleration;

comparing the lateral acceleration and the lateral characteristic to a threshold that is a function of the lateral acceleration and the lateral characteristic;

indicating a roll condition in response to comparing; and controlling a safety system in response to the roll condition.

2. A method as recited in claim 1 wherein the safety system comprises a roll stability control system.

3. A method as recited in claim 1 wherein the safety system comprises an airbag.

4. A method as recited in claim 1 further comprising determining a roll angle; wherein indicating a roll condition comprises indicating a roll condition in response to comparing and the roll angle.

5. A method as recited in claim 1 further comprising determining a longitudinal speed; wherein indicating a roll condition comprises indicating a roll condition in response to comparing and the longitudinal speed.

6. A method as recited in claim 1 further comprising determining a side slip angle; wherein indicating a roll condition comprises indicating a roll condition in response to comparing and the side slip angle.

7. A method as recited in claim 1 wherein the lateral characteristic comprises lateral energy.

8. A method as recited in claim 1 wherein the lateral characteristic comprises lateral energy density.

9. A method as recited in claim 1 wherein the lateral characteristic comprises lateral velocity.

10. A method as recited in claim 1 further comprising determining a vertical acceleration, confirming the roll condition in response to the vertical acceleration.

11. A method of controlling a safety device of an automotive vehicle comprising:

determining a roll angle or rate of the vehicle;

determining a lateral acceleration;

determining a lateral characteristic other than lateral acceleration;

generating a first indication of a roll condition in response to roll angle or rate;

generating a second indication of a roll condition by comparing the lateral acceleration and the lateral characteristic other than the lateral acceleration to a threshold that is a function of the lateral acceleration and the lateral characteristic other than the lateral acceleration; and controlling the safety device in response to the first indication and the second indication.

12. A method as recited in claim 11 further comprising determining a vertical acceleration of the vehicle; safing the first indication in response to vertical acceleration.

13. A method as recited in claim 11 further comprising determining a vertical acceleration of the vehicle; safing the second indication in response to vertical acceleration.

14. A method as recited in claim 11 further comprising determining a side slip angle; wherein controlling the safety device comprises controlling the safety device in response to the side slip angle.

15. A method as recited in claim 14 wherein determining a side slip angle comprises determining a longitudinal speed and a lateral speed.

16. A control system for an automotive vehicle comprising:

a lateral acceleration sensor generating a lateral acceleration signal;

a longitudinal speed sensor generating a longitudinal speed signal;

a lateral speed sensor generating a lateral speed signal;

a roll angle sensor generating a roll angle signal; and a controller coupled to the lateral acceleration sensor, the longitudinal speed sensor, and the roll angle sensor, said controller generating a side slip angle in response to the lateral speed and the longitudinal speed, said controller generating a lateral characteristic other than lateral acceleration said controller indicating a roll condition by comparing the lateral acceleration signal and the lateral characteristic to a threshold and in response to side slip angle and roll angle, said threshold being a function of the lateral acceleration and the lateral characteristic other than the lateral acceleration.

17. A control system as recited in claim 16 wherein said roll angle sensor comprises a roll rate sensor from which roll angle is derived.

18. A control system as recited in claim 16 wherein the safety system comprises a roll stability control system.

19. A control system as recited in claim 16 wherein the safety system comprises an airbag.

20. A control system as recited in claim 16 further comprising a vertical acceleration sensor generating a vertical acceleration signal coupled to the controller, said controller confirming the roll condition in response to the vertical acceleration sensor.

* * * * *